(12) United States Patent
Yang et al.

(10) Patent No.: US 9,262,412 B2
(45) Date of Patent: *Feb. 16, 2016

(54) TECHNIQUES FOR PREDICTIVE INPUT METHOD EDITORS

(71) Applicant: Google Inc., Mountain View, CA (US)

(72) Inventors: Fan Yang, Beijing (CN); Cibu Chalissery Johny, Santa Clara, CA (US); Feng Yuan, Beijing (CN)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/630,740

(22) Filed: Feb. 25, 2015

(65) Prior Publication Data

US 2015/0169552 A1    Jun. 18, 2015

Related U.S. Application Data

(63) Continuation of application No. 13/442,971, filed on Apr. 10, 2012, now Pat. No. 8,996,356.

(51) Int. Cl.
*G06F 17/28* (2006.01)
*G06F 3/023* (2006.01)
*G10L 15/22* (2006.01)

(52) U.S. Cl.
CPC ............ *G06F 17/289* (2013.01); *G06F 3/0237* (2013.01); *G10L 15/22* (2013.01)

(58) Field of Classification Search
CPC ..... G06F 3/0237; G06F 17/276; G06F 3/018; G06F 17/2223
See application file for complete search history.

(56) References Cited

U.S. PATENT DOCUMENTS

| | | | |
|---|---|---|---|
| 6,822,585 B1 | 11/2004 | Ni et al. | |
| 7,107,204 B1 | 9/2006 | Liu et al. | |
| 2002/0019731 A1* | 2/2002 | Masui | G06F 17/276 704/7 |
| 2002/0077808 A1* | 6/2002 | Liu | G06F 3/0237 704/10 |
| 2002/0152203 A1* | 10/2002 | Ostergaard | G06F 3/0237 |
| 2003/0104839 A1 | 6/2003 | Kraft et al. | |
| 2003/0182279 A1* | 9/2003 | Willows | G06F 3/0237 |
| 2004/0095327 A1* | 5/2004 | Lo | G06F 3/0236 345/169 |
| 2005/0043949 A1* | 2/2005 | Roth | G10L 15/22 704/251 |
| 2005/0044495 A1* | 2/2005 | Lee | G06F 17/2223 715/257 |
| 2005/0060138 A1 | 3/2005 | Wang et al. | |
| 2005/0104869 A1* | 5/2005 | Chung | G06F 3/018 345/179 |
| 2005/0144566 A1 | 6/2005 | Zhang | |
| 2005/0162395 A1* | 7/2005 | Unruh | G06F 3/0236 345/169 |
| 2005/0169527 A1* | 8/2005 | Longe | G06F 3/0237 382/177 |
| 2005/0209844 A1 | 9/2005 | Wu et al. | |
| 2005/0283364 A1 | 12/2005 | Longe et al. | |
| 2006/0005129 A1* | 1/2006 | Wen | G06F 3/018 715/262 |

(Continued)

*Primary Examiner* — Jialong He

(74) *Attorney, Agent, or Firm* — Remarck Law Group PLC

(57) ABSTRACT

A computer-implemented technique is presented. The technique can include receiving, at a computing device comprising one or more processors, a first input from a user, the first input including one or more first characters in a first language. The technique can provide for suggestion of potential transliterations to a second language of potential words beginning with the one or more first characters. The technique can present the potential transliterations in either an off-the-spot input configuration or an inline input configuration. The user can then select one of the potential transliterations. The technique can also provide the one or more first characters as an additional or partial word as a potential selection for the user. In this manner, the user can also select the exact one or more first characters that were input to the computing device.

20 Claims, 6 Drawing Sheets

(56) References Cited

U.S. PATENT DOCUMENTS

| | | | | |
|---|---|---|---|---|
| 2006/0146028 A1* | 7/2006 | Chang | G06F 3/018 | 345/169 |
| 2006/0149551 A1* | 7/2006 | Ganong, III | G10L 15/22 | 704/270.1 |
| 2006/0190256 A1* | 8/2006 | Stephanick | G06F 17/2735 | 704/252 |
| 2006/0265208 A1* | 11/2006 | Assadollahi | G06F 3/0237 | 704/9 |
| 2006/0265648 A1* | 11/2006 | Rainisto | G06F 3/0237 | 715/259 |
| 2007/0016862 A1* | 1/2007 | Kuzmin | G06F 3/0236 | 715/700 |
| 2007/0233463 A1* | 10/2007 | Sparre | G06F 17/276 | 704/10 |
| 2007/0239434 A1 | 10/2007 | Rubanovich et al. | | |
| 2008/0077406 A1 | 3/2008 | Ganong, III | | |
| 2008/0141125 A1* | 6/2008 | Ghassabian | G06F 3/0237 | 715/261 |
| 2008/0193015 A1 | 8/2008 | Hong | | |
| 2008/0215307 A1* | 9/2008 | Li | G06F 17/2863 | 704/3 |
| 2009/0092323 A1* | 4/2009 | Qiu | G06F 17/273 | 382/229 |
| 2009/0187399 A1* | 7/2009 | O'Dell | G06F 3/018 | 704/8 |
| 2009/0225041 A1 | 9/2009 | Kida et al. | | |
| 2011/0099506 A1* | 4/2011 | Gargi | G06F 3/0234 | 715/773 |
| 2011/0316772 A1* | 12/2011 | Zhang | G06F 3/0236 | 345/156 |

* cited by examiner

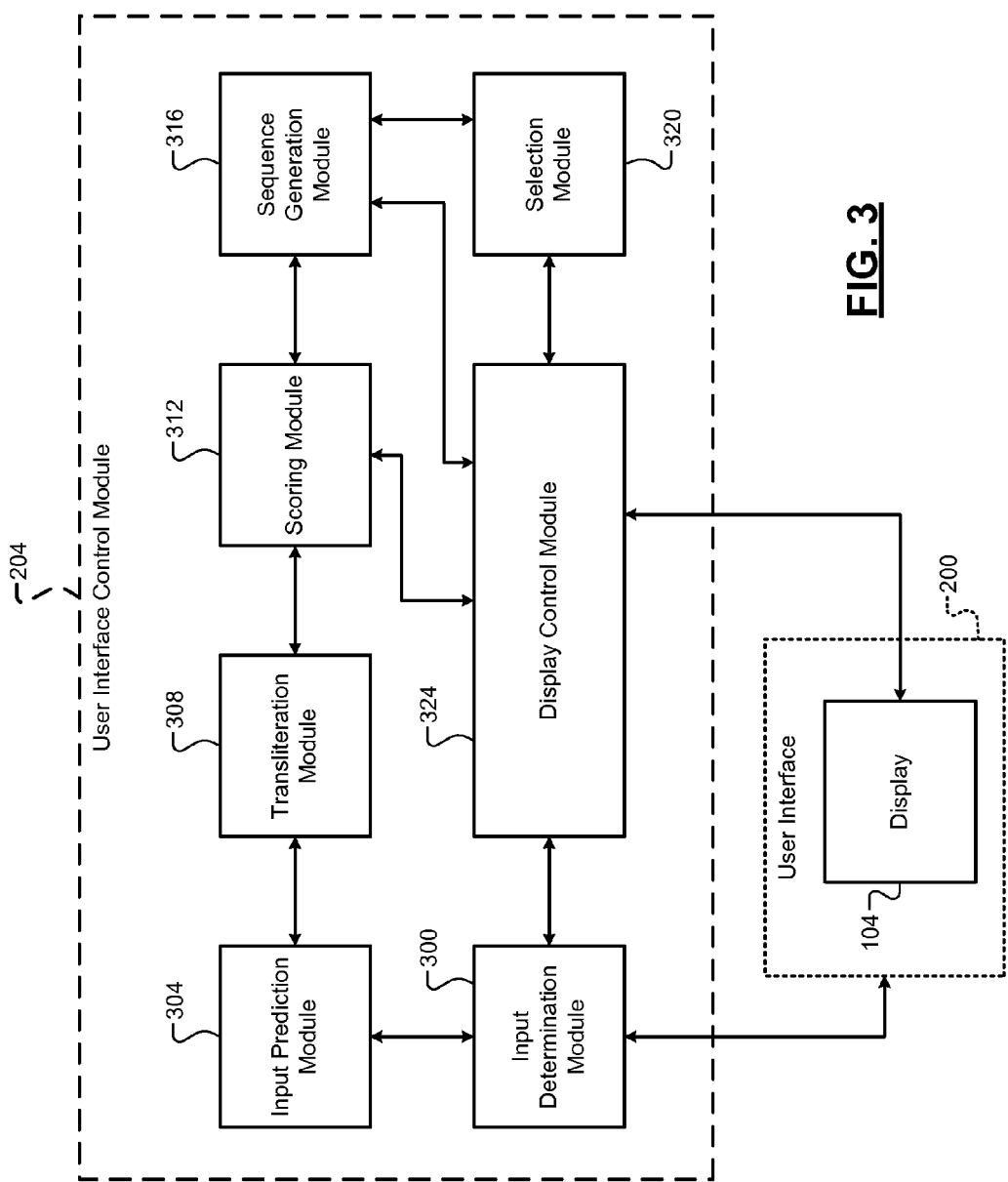

TECHNIQUES FOR PREDICTIVE INPUT METHOD EDITORS

CROSS-REFERENCE TO RELATED APPLICATION

This application is a continuation of U.S. patent application Ser. No. 13/442,971, filed Apr. 10, 2012. The entire disclosure of the above application is incorporated herein by reference.

FIELD

The present disclosure relates to input method editors (IMEs) for computing devices and, more particularly, to techniques for predictive IMEs.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A "computing device" generally refers to a device including a user interface and one or more processors. A computing device can be a stationary device, such as a desktop computer, or a mobile device, such as a laptop computer, a tablet computer, a mobile phone, and the like. The user interface of the computing device can include a display and other user input devices (a keyboard, a mouse, etc.). The display may also be a touch display and therefore may display information and receive user input. The one or more processors of the computing device may be configured to execute one or more input method editors (IMEs). IMEs refer to software programs, e.g., applications, which allow a user to input text to the computing device in a plurality of languages. Some languages, however, have different written scripts. For example, English includes Latin or Roman alphabet-based characters, whereas Chinese includes on thousands of logogram-based characters.

SUMMARY

A computer-implemented technique is presented. The technique can include receiving, at a computing device comprising one or more processors, a first input from a user. The first input can include one or more first characters in a first language. The technique can include determining, at the computing device, a plurality of first words in a second language based on the first input. The plurality of first words can represent potential transliterations of a plurality of second words from the first language to the second language, respectively. Each of the plurality of second words can be a potential word beginning with the one or more first characters. The technique can include determining, at the computing device, a probability score for each of the plurality of first words using a language model. The probability score for a specific first word can indicate a likelihood that (i) a specific second word corresponding to the specific first word is an appropriate word beginning with the one or more first characters and (ii) the specific first word is an appropriate transliteration of the specific second word. The technique can include determining, at the computing device, a first sequence of words based on the plurality of first words and their corresponding probability scores. The first sequence of words can include the plurality of first words being ordered from a highest relative probability score to a lowest relative probability score. The technique can include removing, at the computing device, a first word from the first sequence of words to obtain a modified first sequence of words. The first word can have the highest relative probability score. The technique can include generating, at the computing device, a second sequence of words based on the modified first sequence of words and an additional word comprising the one or more first characters. The second sequence of words can include the additional word as a last word in the second sequence of words. The technique can include providing, in a first area of a display of the computing device, the first word from the first sequence of words. The technique can include providing, in a second area of the display of the computing device, the second sequence of words and corresponding indications of their relative probability scores. The second area can be different than the first area. The technique can include receiving, at the computing device, a second input indicating a selection by the user of the first word or one of the second sequence of words, the second input being used to obtain a selected input. The technique can also include providing, at the display of the computing device, the selected input.

Another computer-implemented technique is also presented. The technique can include receiving, at a computing device comprising one or more processors, a first input from a user. The first input can include one or more first characters in a first language. The technique can include determining, at the computing device, a plurality of first words in a second language based on the first input. The plurality of first words can represent potential transliterations of a plurality of second words from the first language to the second language, respectively. Each of the plurality of second words can be a potential word beginning with the one or more first characters. The technique can include determining, at the computing device, a probability score for each of the plurality of first words using a language model. The probability score for a specific first word can indicate a likelihood that (i) a specific second word corresponding to the specific first word is an appropriate word beginning with the one or more first characters and (ii) the specific first word is an appropriate transliteration of the specific second word. The technique can include determining, at the computing device, one of the plurality of first words having a highest relative probability score to obtain a selected first word. The technique can include providing, in a first area of a display of the computing device, the selected first word. The technique can also include providing, in a second area of the display of the computing device, (i) a remainder of the plurality of first words and corresponding indications of their relative probability scores and (ii) the one or more first characters and a corresponding indication of a lowest relative probability score.

In some embodiments, the first and second areas can be arranged in an off-the-spot configuration.

In other embodiments, the first and second areas can be located within a text editing area, the text editing area being separate from a text input area including a cursor.

In some embodiments, the first area can be located above the second area within the text editing area and below the text input area.

In other embodiments, the technique can further include receiving, at the computing device, a second input indicating a selection by the user of the selected first word, one of the remainder of the plurality of first words, or the one or more first characters, the second input being used to obtain a selected input.

In some embodiments, the technique can further include displaying, in the text input area of the display of the computing device, the selected input.

In other embodiments, the first and second areas can be arranged in an inline configuration.

In some embodiments, the first area can be a text input area including a cursor, and the second area can be a text editing area located below the first area.

In other embodiments, the technique can further include receiving, at the computing device, a second input indicating a selection by the user of the selected first word, one of the remainder of the plurality of first words, or the one or more first characters, the second input being used to obtain a selected input.

In some embodiments, the technique can further include replacing, in the text input area of the display of the computing device, the one or more first characters with the selected input.

A computing device comprising one or more processors is also presented. The computing device can include a user interface and a user interface control module. The user interface can be configured to receive a first input from a user, the first input including one or more first characters in a first language. The user interface control module can be configured to determine a plurality of first words in a second language based on the first input. The plurality of first words can represent potential transliterations of a plurality of second words from the first language to the second language, respectively. Each of the plurality of second words can be a potential word beginning with the one or more first characters. The user interface control module can be further configured to determine a probability score for each of the plurality of first words using a language model. The probability score for a specific first word can indicate a likelihood that (i) a specific second word corresponding to the specific first word is an appropriate word beginning with the one or more first characters and (ii) the specific first word is an appropriate transliteration of the specific second word. The user interface control module can be further configured to determine one of the plurality of first words having a highest relative probability score to obtain a selected first word. The user interface can be further configured to provide the selected first word in a first area of a display of the computing device. The user interface can be further configured to provide (i) a remainder of the plurality of first words and corresponding indications of their relative probability scores and (ii) the one or more first characters and a corresponding indication of a lowest relative probability score, in a second area of the display of the computing device.

In some embodiments, the first and second areas can be arranged in an off-the-spot configuration.

In other embodiments, the first and second areas can be located within a text editing area, the text editing area being separate from a text input area including a cursor.

In some embodiments, the first area can be located above the second area within the text editing area and below the text input area.

In other embodiments, the user interface can be further configured to receive a second input indicating a selection by the user of the selected first word, one of the remainder of the plurality of first words, or the one or more first characters, the second input being used to obtain a selected input.

In some embodiments, the user interface can be further configured to display the selected input in the text input area of the display of the computing device.

In other embodiments, the first and second areas can be arranged in an inline configuration.

In some embodiments, the first area can be a text input area including a cursor, and the second area can be a text editing area located below the first area.

In other embodiments, the user interface can be further configured to receive a second input indicating a selection by the user of the selected first word, one of the remainder of the plurality of first words, or the one or more first characters, the second input being used to obtain a selected input. The user interface can be further configured to replace the one or more first characters with the selected input in the text input area of the display of the computing device.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 is a functional block diagram of the example input control module of FIG. 2;

DETAILED DESCRIPTION

Figure 1:
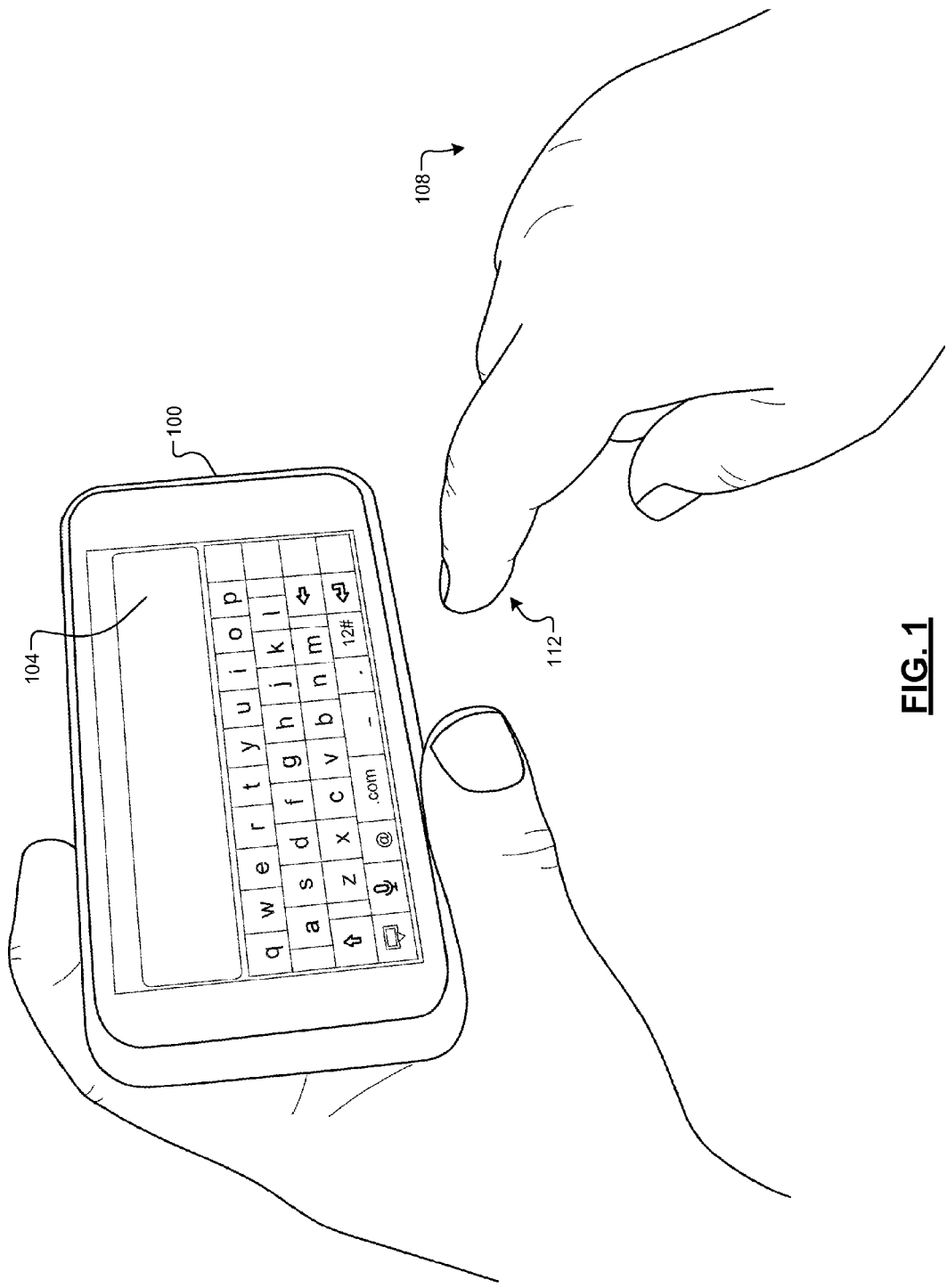
FIG. 1 is a schematic illustration showing interaction between a user and a computing device.

Referring now to FIG. 1, interaction between a user 108 and an example computing device 100 is illustrated. While the computing device 100 is illustrated as a mobile device, e.g., a mobile phone, it should be appreciated that the computing device 100 can be any suitable computing device having a user interface and one or more processors. The user 108 can interact with the computing device at a display 104. The display 104 can display information to the user 108 and receive input from the user 108 (also known as a "touch display"). For example, the user 108 can provide input at the display 104 using one or more fingers 112. While the display 104 is illustrated as a touch display, it should be appreciated that the display 104 can be any suitable display.

As previously mentioned, some languages have different written scripts. For example, English includes Latin or Roman alphabet-based characters, whereas Chinese includes thousands of logogram-based characters. Due to size constraints, however, a user interface of a computing device may include or may be capable of displaying a limited number of characters. For example, as shown in FIG. 1, the display 104 of the computing device 100 only displays English characters to the user 108. The IME software, therefore, may provide for transliteration between languages. Transliteration refers to a process of converting one script to another script. For example, the IME software may perform transliteration from English to Chinese. It should be that, although the present disclosure is described with respect to transliteration decoding, any form of decoding algorithm that converts one script to another script may be utilized, e.g., shape-based decoding. As used herein the term "transliteration" is intended to include any form of decoding algorithm for converting one script to another script (transliteration, shape-based decoding, etc.).

Accordingly, techniques for predictive IMEs are presented. The techniques generally provide for more accurate user input, faster user input, and/or an improved user experience. The techniques can be applied to both an off-the-spot input configuration and an inline input configuration. It should be appreciated that the techniques could also be applied to other input configurations. The off-the-spot input configuration refers to a text editing area being located below a text input area. The text editing area refers to an area of a display in which text editing is performed, e.g., transliteration is selected, whereas the text input area refers to an area of the display in which the text is finally "input" to the computing device, e.g., for text messaging or e-mailing. The inline input configuration, on the other hand, refers to the text editing area being the same as (or "inline" with) the text input area.

The techniques include receiving, at a computing device including one or more processors, a first input from a user, the first input including one or more characters in a first language, e.g., English. The first language may represent a transliteration of a second language, e.g., Chinese. In other words, the first language may be a phonetic representation of the second language. For example, Pinyin is a transliteration of Chinese. It should be appreciated that the second language can be any language having a different written script than the first language. For example only, the second language could be Japanese, Korean, or Hindi. The techniques include determining, at the computing device, a plurality of first words in the second language based on the first input. The plurality of first words can represent potential transliterations of a plurality of second words from the first language to the second language, respectively. Each of the plurality of second words can be potential words beginning with the one or more first characters.

The techniques include determining, at the computing device, a probability score for each of the plurality of first words using a language model. The probability score for a specific first word indicating a likelihood that (i) a specific second word to the specific first word is an appropriate word beginning with the one or more first characters and (ii) the specific first word is an appropriate transliteration of the specific second word. The techniques include determining, at the computing device, one of the plurality of first words having a highest relative probability score to obtain a selected first word. More specifically, after determining the probability score for each of the plurality of first words, the plurality of first words can be "ordered" or "ranked" according to their probability scores, e.g., from high to low. In some implementations, the techniques can determine a sequence of the plurality of first words using their probability scores.

The techniques include providing, in a first area of the display of the computing device, the selected first word. In some implementations, the selected first word may be removed from the sequence to obtain a modified sequence. The techniques include providing, in a second area of the computing device, (i) a remainder of the plurality of first words and corresponding indications of their relative probability scores and (ii) the one or more first characters and a corresponding indication of a lowest probability score. In some implementations, the one or more first characters may be inserted as an "additional word" at an end of the modified sequence to obtain a new sequence. In an off-the-spot input configuration, the first area is part of the text editing area and the second area is part of a text suggestion area. In this case, both the text editing area and the text suggestion area are separate from the text input area, and the second area/text suggestion area could also be referred to as the text editing area. In the inline input configuration, the first area (the text editing area) is part of the text input area. The second area is part of a text suggestion area, which in this case is separate from the first area/text editing area/text input area.

Figure 2:
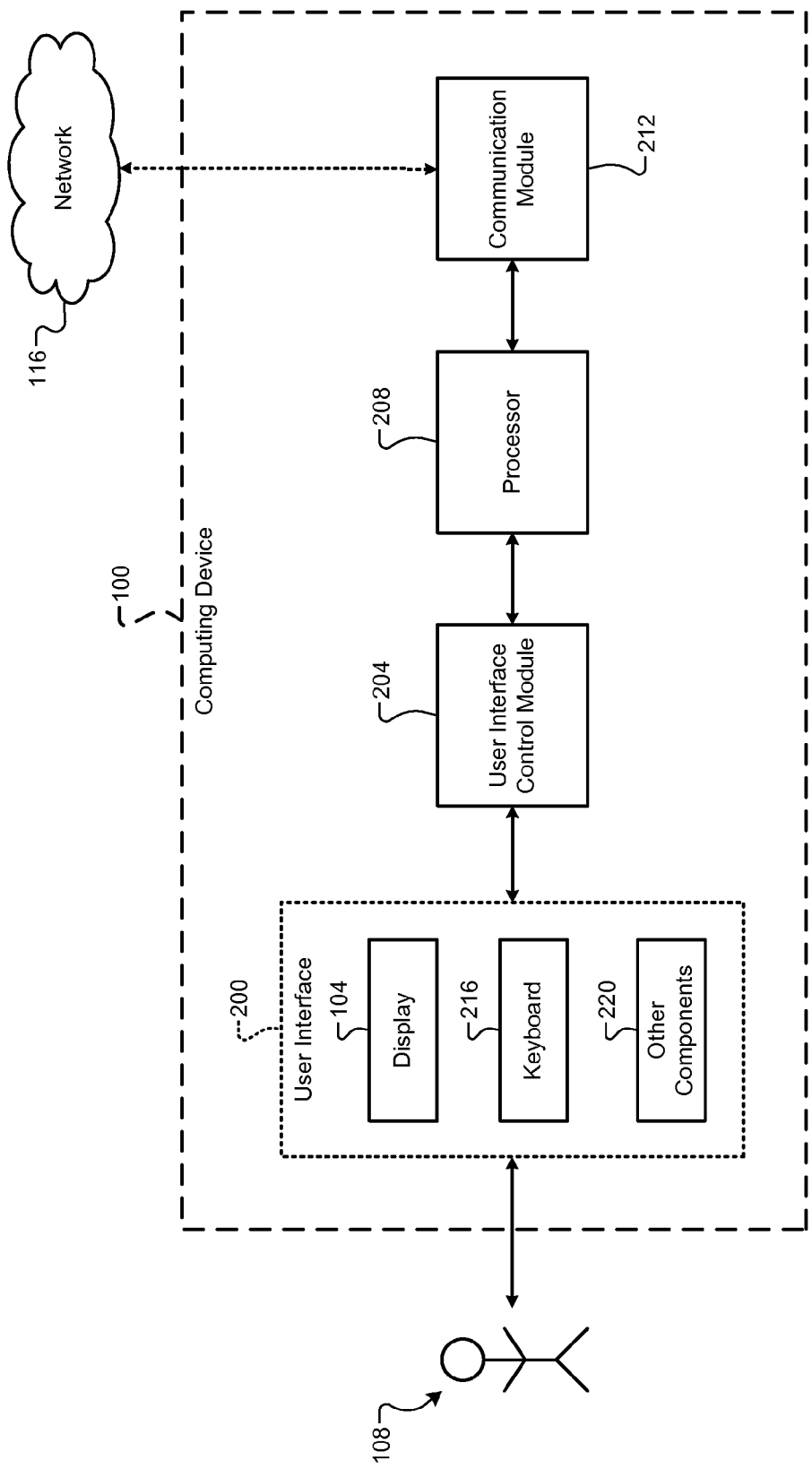
FIG. 2 is a functional block diagram illustrating the example computing device of FIG. 1 according to some implementations of the present disclosure.

Referring now to FIG. 2, a functional block diagram of the computing device 100 is illustrated. The computing device 100 can include a user interface 200, a user interface control module 204, a processor 208, and a communication module 212. It should be appreciated that the computing device 100 can also include other suitable components such as memory and/or one or more additional processors. The user interface control module 204 and the communication module 212 can also be executed entirely or partially by the processor 208 (or two or more processors, depending on the configuration).

The user interface 200 provides information to, and receives input from, the user 108. The user interface 200 can include the display 104 and a keyboard 216. As previously mentioned, the display 104 can be a touch display that provides information to the user 108 and receives input from the user 108. It should be appreciated that the user interface 200 can also include other components 220 suitable for interaction with the user 108, such as a mouse, one or more buttons, one or more audio components, and/or a vibrator.

The user interface control module 204 controls the user interface 200. Specifically, the user interface control module 204 can control the information provided to the user 108, e.g., at the display 104. The user interface control module 204 can also interpret the input from the user 108 at the user interface 200. For example, the user interface control module 204 can determine one or more characters input by the user 108. The user interface control module 204 can also execute the techniques of the present disclosure. More specifically, the user interface control module 204 can provide a predictive IME that performs transliteration according to either an off-the-spot input configuration or an inline input configuration.

As previously mentioned, the processor 208 can entirely or partially execute the modules of the computing device 100, e.g., the user interface control module 204. The processor 208 can also control other functions of the computing device 100, including but not limited to, loading an operating system of the computing device 100 and controlling memory storage/retrieval operations, e.g., loading IME and/or communication parameters.

The communication module 212 controls communication between the computing device 100 and other devices. Specifically, the communication module 212 may be configured for communication via a network 116. The network 116 can include a local area network (LAN), a wide area network (WAN), e.g., the Internet, or a combination thereof. The communication module 212 can also be configured for communication via one or more of a plurality of different mediums, e.g., radio frequency and satellite.

Referring now to FIG. 3, a functional block diagram of the user interface control module 204 is illustrated. The user interface control module 204 can include an input determination module 300, an input prediction module 304, a transliteration module 308, a scoring module 312, a sequence generation module 316, a selection module 320, and a display control module 324. It should be appreciated that the user interface control module 204 can also include other components such as memory. As previously described, the modules of the user interface control module 204 could be executed entirely or partially by the processor 208 (or two or more processors, depending on the configuration).

The input determination module 300 receives the first input from the user 108. The first input can include one or more characters in the first language, e.g., Pinyin. The transliteration module 308 determines the plurality of first words in the second language based on the first input. The plurality of first words in the second language can represent potential transliterations of a plurality of second words, respectively. The input prediction module 304 can determine the plurality of second words based on the first input. Each of the plurality of second words can represent a potential word beginning with the one or more characters. For example only, the one or more first characters could be "he" and the plurality of second words could include "he", "hell", and "hello".

The scoring module 312 can generate a probability score for each of the plurality of first words using a language model. The language model could be pre-loaded at the computing device 100, downloaded via the network 116, or a combination thereof. For example only, the language model may be a datastore including, for each of a plurality of different languages, a plurality of different words and potential transliterations for each word. Each probability score indicates a likelihood that (i) a specific second word corresponding to the specific first word is an appropriate word beginning with the one or more first characters and (ii) the specific first word is an appropriate transliteration of the specific second word.

In some implementations, the sequence generation module 316 can determine a first sequence of words based on the plurality of first words and their corresponding probability scores. The first sequence of words can include the plurality of first words being ordered (or ranked) from a highest relative probability score to a lowest relative probability score. The selection module 320 can select a first word from the first sequence of words, where the first word has the highest relative probability score. After removing the first word from the first sequence of words to obtain a modified first sequence of words, the sequence generation module 316 can generate a second sequence of words based on the modified first sequence of words and an additional word comprising the one or more first characters. In this manner, the additional word represents an exact string of characters that the user 108 inputs to the computing device 104. The additional word, however, may be an incomplete word. In other words, the one or more first characters may only represent a partial word. The second sequence of words can include the additional word as a last word in the second sequence of words, e.g., inserted as a last entry in the second sequence of words.

The display control module 324 controls the display 104 of the user interface 200. The display control module 324 can provide the first word from the first sequence of words in a first area of the display 104. The display control module 324 can provide the second sequence of words and corresponding indications of their relative probability scores in a second area of the display 104. For example, the indications of the relative probabilities can be numbering, e.g., "1" for the highest relative probability and so on. Depending on the input configuration, e.g., off-the-spot vs. inline, the first area can be different than the text input area.

In some implementations, however, the selection module 320 can select one of the plurality of first words having the highest probability to obtain a selected first word and not generate the first or second sequences of words. The display control module 324 can then provide the selected first word in a first area of the display 104. The display control module 324 can also provide (i) a remainder of the plurality of first words and corresponding indications of their relative probability scores and (ii) the one of more first characters and a corresponding indication of a lowest probability score, in a second area of the display 104. Depending on the input configuration, e.g., off-the-spot vs. inline, the first area can be different than the text input area.

The display control module 324 can alternatively provide a subset of the second sequence of words (or the remainder of the plurality of first words). More specifically, due to size constraints of the display 104, there may be more possible words than are able to be shown on the display 104. In this case, the display control module 324 can provide a subset of the second sequence of words. The subset can include words having the highest relative probabilities. The subset, however, can have the one or more first characters (the additional or partial word) as a last entry, as previously described. For example only, if the second sequence of words includes ten words and the display 104 is capable of displaying five words, the display control module 324 can provide the subset including the top four words from the second sequence of words plus the additional or partial word.

After providing the information to the user 108 at the display 104, the user 108 could also provide second input at the user interface 200. The second input can indicate a selection by the user 108 of one of the second sequence of words (or the remainder of the plurality of first words), i.e., not the first word/selected word. The input determination module 300 can determine the word or the one or more characters (the additional or partial word) selected by the user 108 based on the second input. The display control module 324 can then provide the selected word or the selected one or more characters at the display 104, e.g., in the first area of the display.

Figure 4A:
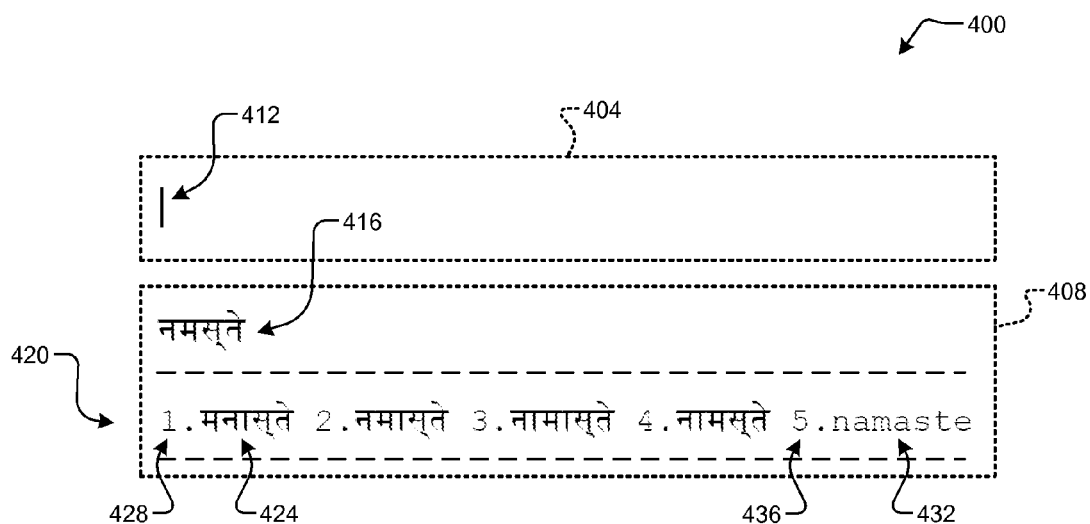
FIGS. 4A-4B are schematic illustrations of example information provided to the user at the display of the computing device of FIG. 2.
Figure 4B:
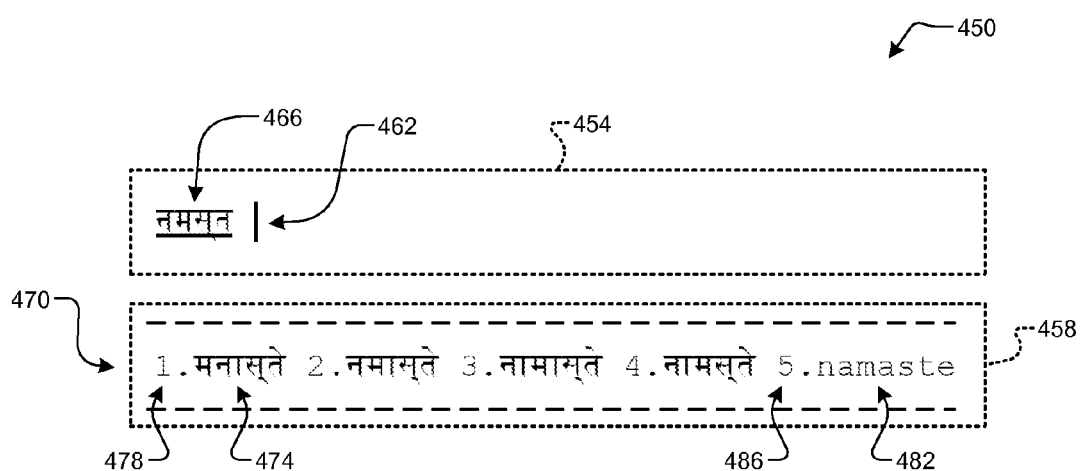

Referring now to FIGS. 4A-4B, example information provided to the user 108 at the display 104 of the computing device 100 is illustrated. The example words and characters illustrated in FIGS. 4A-4B include both Hindi and English.

FIG. 4A illustrates an off-the-spot input configuration 400 that can be provided to the display 104. The off-the-spot input configuration 400 includes a text input area 404 and a text editing area 408. The text input area 404 can include a cursor 412. The text input area 404 represents the area where text appears after editing (or selection) for a word is complete. A first area of the text editing area 408 is generally referenced as 416. The first area 416 includes the first word/selected word (as previously described). More specifically, the first area 416 includes the one of the plurality of first words having the highest relative probability score. A second area of the text editing area 408 is generally referenced as 420. The second area 420 displays the second sequence of words and their corresponding indicators. For example, a first entry in the second sequence of words is referenced as 424 and its corresponding indicator ("1.") is referenced as 428. At the end of the second sequence of words is the one of more first characters ("namaste", also referred to as the "additional word"), referenced as 432, and its corresponding indicator 436 ("5."). Alternatively, the second area 420 can be described as displaying the remainder of the first plurality of words and their corresponding indicators and the one or more first characters (the "additional word" 432) and its corresponding indicator 436.

FIG. 4B, on the other hand, illustrates an inline input configuration 450. The inline input configuration 450 includes a text input area 454 and a text editing area 458. The text input area 454 can include a cursor 462. A first area of the text editing area 458 is generally referenced as 466. The first area 466 includes the first word/selected word (as previously described). More specifically, the first area 466 includes the one of the plurality of first words having the highest relative probability score. In other words, in the inline input configuration 450 the first area 466 (the first word/selected word) appears inline with the text input area 454. A second area of the text editing area 408 is generally referenced as 470. The second area 470 displays the second sequence of words and their corresponding indicators. For example, a first entry in the second sequence of words is referenced as 474 and its corresponding indicator ("1.") is referenced as 478. At the end of the second sequence of words is the one or more first characters ("namaste", also referred to as the "additional word"), referenced as 482, and its corresponding indicator 486 ("5."). Alternatively, the second area 470 can be described as displaying the remainder of the first plurality of words and their corresponding indicators and the one or more first characters (the "additional word" 482) and its corresponding indicator 486.

Figure 5:
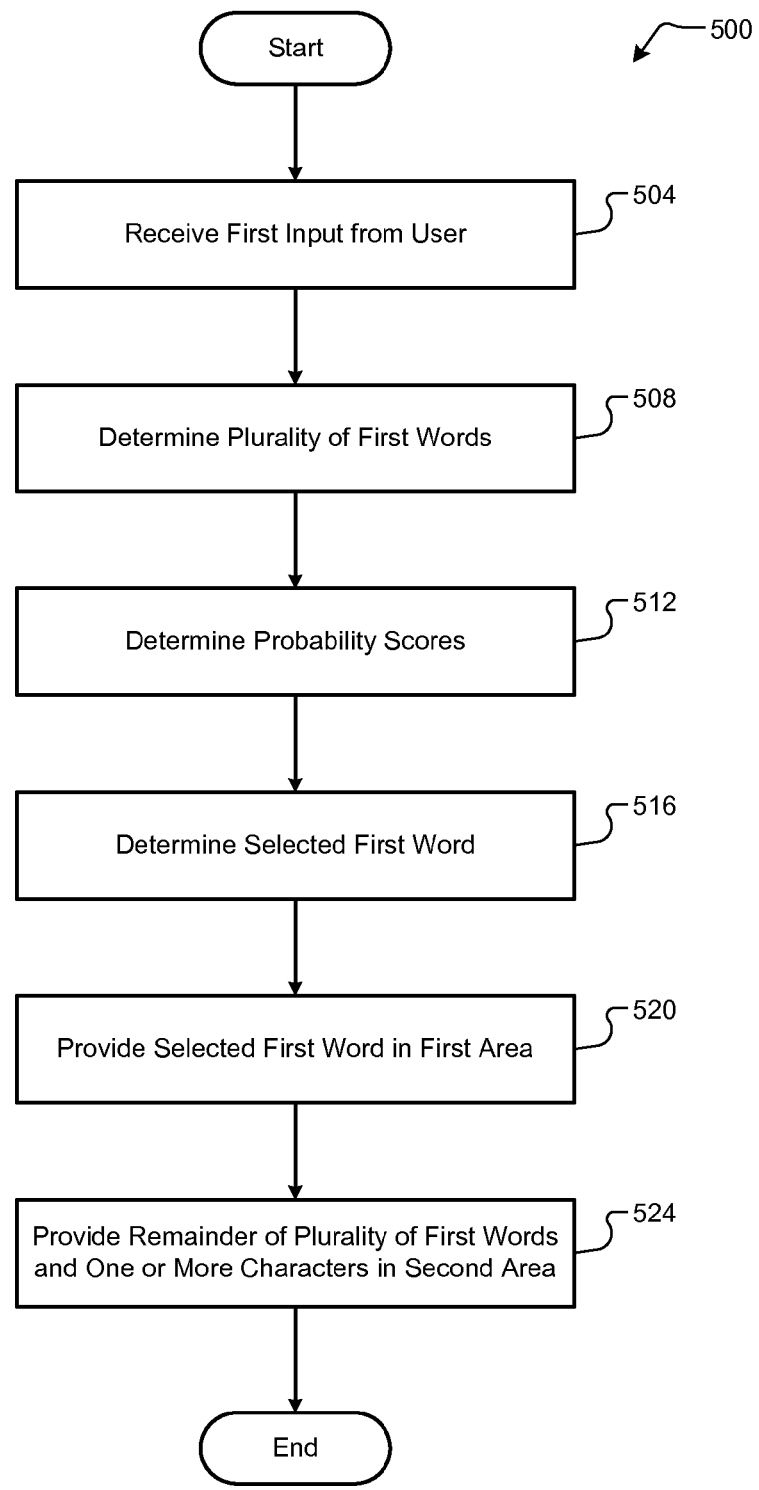
FIG. 5 is a flow diagram illustrating an example technique for a predictive input method editor (IME) according to some implementations of the present disclosure.

Referring now to FIG. 5, an example technique 500 for a predictive IME is illustrated. At 504, the user interface 200 can receive the first input from the user 108. The first input can include one or more first characters in the first language, e.g., Pinyin. At 508, the user interface control module 204 can determine the plurality of first words in the second language, e.g., Chinese, based on the first input. The plurality of first words can represent potential transliterations of the plurality of second words from the first language to the second language, respectively. Each of the plurality of second words can be potential words beginning with the one or more first characters.

At 512, the user interface control module 204 can determine the probability score for each of the plurality of first words using the language model. The probability score for a specific first word can indicate a likelihood that (i) a specific second word corresponding to the specific first word is an appropriate word beginning with the one or more first characters and (ii) the specific first word is an appropriate transliteration of the specific second word. At 516, the user interface control module 204 can determine one of the plurality of first words having a highest relative probability score to obtain the selected first word.

At 520, the user interface control module 204 can provide the selected first word in the first area at the display 104 of the computing device 100. At 524, the user interface control module 204 can provide (i) the remainder of the plurality of first words and corresponding indications of their relative probability scores and (ii) the one of more first characters and the corresponding indication of the lowest probability score, in the second area at the display 104 of the computing device 100. The technique 500 can then end or return to 504 for one or more additional cycles.

Figure 6:
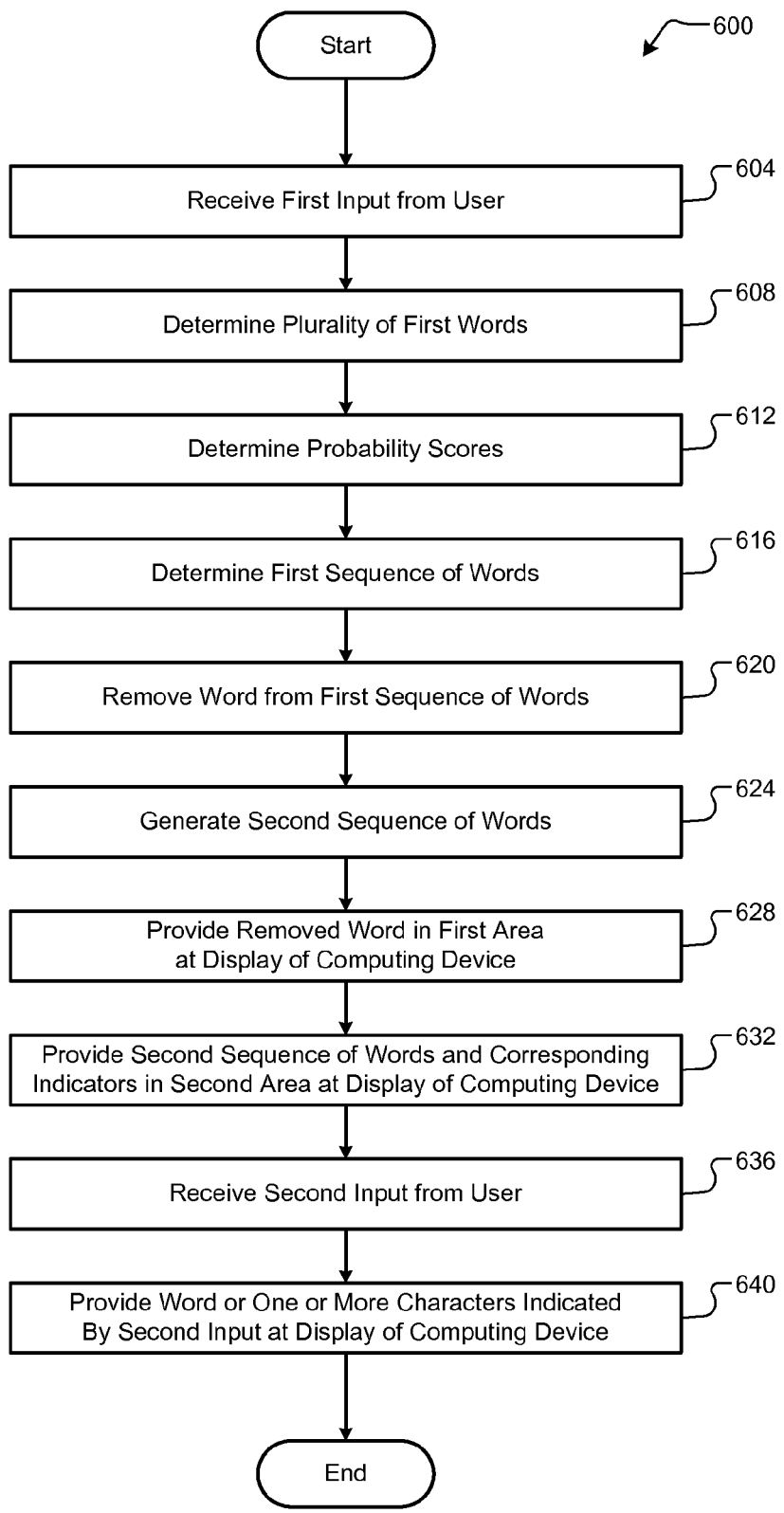
FIG. 6 is a flow diagram illustrating another example technique for a predictive IME according to some implementations of the present disclosure.

Referring now to FIG. 6, another example technique 600 for a predictive IME is illustrated. At 604, the user interface 200 can receive the first input including one or more first characters in the first language, e.g., Pinyin. At 608, the user interface control module 204 can determine the plurality of first words in the second language, e.g., Chinese, based on the first input. The plurality of first words can represent potential transliterations of the plurality of second words from the first language to the second language, respectively. Each of the plurality of second words can be a potential word beginning with the one or more first characters.

At 612, the user interface control module 204 can determine the probability score for each of the plurality of first words using a language model. The probability score for a specific first word can indicate a likelihood that (i) a specific second word corresponding to the specific first word is an appropriate word beginning with the one or more first characters and (ii) the specific first word is an appropriate transliteration of the specific second word. At 616, the user interface control module 204 can determine the first sequence of words based on the plurality of first words and their corresponding probability scores. The first sequence of words can include the plurality of first words being ordered from a highest relative probability score to a lowest relative probability score.

At 620, the user interface control module 204 can remove a first word from the first sequence of words to obtain a modified first sequence of words. The first word can be one of the first sequence of words having the highest relative probability score. A 624, the user interface control module 204 can generate the second sequence of words based on the modified first sequence of words and the additional word comprising the one or more first characters. The second sequence of words can include the additional or partial word as a last word in the second sequence of words.

At 628, the user interface control module 204 provides the first word from the first sequence of words in the first area at the display 104 of the computing device 100. At 632, the user interface control module 204 provides the second sequence of words and corresponding indications of their relative probability scores in the second area at the display 104 of the computing device. The second area can be different than the first area. At 636, the user interface 200 receives the second input indicating a selection by the user of the first word or one of the second sequence of words. At 640, the user interface control module 204 provides the word or the one or more characters indicated by the second input. The technique can then end or return to 604 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:
obtaining, at a computing system having a display and one or more processors, one or more source characters in a source language;
obtaining, by the computing system, a plurality of target words in a target language representing potential transliterations of a plurality of source words from the source language, each of the plurality of source words beginning with the one or more source characters;
obtaining, by the computing system, a selected target word having a highest likelihood that (i) a specific source word corresponding to the selected target word is an appropriate source word beginning with the one or more source characters and (ii) the selected target word is an appropriate transliteration of the specific source word;

outputting, in a first area of the display, the selected target word; and outputting, in a second area of the display, (i) a remainder of the plurality of target words and corresponding indications of their relative likelihoods and (ii) the one or more source characters and a corresponding indication of a lowest relative likelihood.

2. The computer-implemented method of claim 1, wherein the first and second areas are arranged in an off-the-spot configuration.

3. The computer-implemented method of claim 2, wherein the first and second areas are located within a text editing area, the text editing area being separate from a text input area.

4. The computer-implemented method of claim 3, wherein the first area is located above the second area within the text editing area and below the text input area.

5. The computer-implemented method of claim 1, wherein the first and second areas are arranged in an inline configuration.

6. The computer-implemented method of claim 5, wherein the first area is a text input area, and wherein the second area is a text editing area located below the first area.

7. The computer-implemented method of claim 1, further comprising determining, by the computing system, a probability score for each of the plurality of target words using a language model, the probability score for a specific target word indicating its likelihood.

8. A computing system having a display and at least one or more processors, the computing system configured to perform operations comprising:

obtaining one or more source characters in a source language;

obtaining a plurality of target words in a target language representing potential transliterations of a plurality of source words from the source language, each of the plurality of source words beginning with the one or more source characters;

obtaining a selected target word having a highest likelihood that (i) a specific source word corresponding to the selected target word is an appropriate source word beginning with the one or more source characters and (ii) the selected target word is an appropriate transliteration of the specific source word;

outputting, in a first area of the display, the selected target word; and outputting, in a second area of the display, (i) a remainder of the plurality of target words and corresponding indications of their relative likelihoods and (ii) the one or more source characters and a corresponding indication of a lowest relative likelihood.

9. The computing system of claim 8, wherein the first and second areas are arranged in an off-the-spot configuration.

10. The computing system of claim 9, wherein the first and second areas are located within a text editing area, the text editing area being separate from a text input area.

11. The computing system of claim 10, wherein the first area is located above the second area within the text editing area and below the text input area.

12. The computing system of claim 8, wherein the first and second areas are arranged in an inline configuration.

13. The computing system of claim 12, wherein the first area is a text input area, and wherein the second area is a text editing area located below the first area.

14. The computing system of claim 8, wherein the operations further comprise determining a probability score for each of the plurality of target words using a language model, the probability score for a specific target word indicating its likelihood.

15. A non-transitory computer-readable medium having instructions stored thereon that, when executed by one or more processors of a computing system, cause the computing system to perform operations comprising:

obtaining one or more source characters in a source language;

obtaining a plurality of target words in a target language representing potential transliterations of a plurality of source words from the source language, each of the plurality of source words beginning with the one or more source characters;

obtaining a selected target word having a highest likelihood that (i) a specific source word corresponding to the selected target word is an appropriate source word beginning with the one or more source characters and (ii) the selected target word is an appropriate transliteration of the specific source word;

outputting, in a first area of a display of the computing system, the selected target word; and outputting, in a second area of the display, (i) a remainder of the plurality of target words and corresponding indications of their relative likelihoods and (ii) the one or more source characters and a corresponding indication of a lowest relative likelihood.

16. The computer-readable medium of claim 15, wherein the first and second areas are arranged in an off-the-spot configuration.

17. The computer-readable medium of claim 16, wherein the first and second areas are located within a text editing area, the text editing area being separate from a text input area.

18. The computer-readable medium of claim 17, wherein the first area is located above the second area within the text editing area and below the text input area.

19. The computer-readable medium of claim 15, wherein the first and second areas are arranged in an inline configuration.

20. The computer-readable medium of claim 19, wherein the first area is a text input area, and wherein the second area is a text editing area located below the first area.

* * * * *